(12) United States Patent
Yamada et al.

(10) Patent No.: US 11,602,011 B2
(45) Date of Patent: Mar. 7, 2023

(54) HEATING DEVICE

(71) Applicant: OMRON Corporation, Kyoto (JP)

(72) Inventors: Takaaki Yamada, Kusatsu (JP); Hiroyuki Togawa, Otsu (JP); Hajime Tsubata, Kusatsu (JP)

(73) Assignee: OMRON Corporation, Kyoto (JP)

( * ) Notice: Subject to any disclaimer, the term of this patent is extended or adjusted under 35 U.S.C. 154(b) by 319 days.

(21) Appl. No.: 16/639,739

(22) PCT Filed: Dec. 20, 2018

(86) PCT No.: PCT/JP2018/046936
§ 371 (c)(1),
(2) Date: Feb. 17, 2020

(87) PCT Pub. No.: WO2019/138830
PCT Pub. Date: Jul. 18, 2019

(65) Prior Publication Data
US 2020/0187304 A1 Jun. 11, 2020

(30) Foreign Application Priority Data
Jan. 9, 2018 (JP) .............................. JP2018-000998

(51) Int. Cl.
*H05B 1/02* (2006.01)
*G05D 23/19* (2006.01)
(52) U.S. Cl.
CPC .............. *H05B 1/023* (2013.01); *G05D 23/19* (2013.01)
(58) Field of Classification Search
CPC .............. G05D 23/1919; G05D 23/19; G05D 23/1932; G05D 23/20; G05B 11/32;
(Continued)

(56) References Cited

U.S. PATENT DOCUMENTS

| 5,777,881 A | 7/1998 | Kanno | |
|---|---|---|---|
| 2003/0121905 A1* | 7/2003 | Nanno | ............... G05D 23/1932 219/486 |

(Continued)

FOREIGN PATENT DOCUMENTS

| CN | 101893296 | 11/2010 |
|---|---|---|
| CN | 104048993 B * | 1/2017 |

(Continued)

OTHER PUBLICATIONS

Office Action of Taiwan Counterpart Application, with English translation thereof, dated Dec. 19, 2019, pp. 1-6.

(Continued)

*Primary Examiner* — Tu B Hoang
*Assistant Examiner* — Vy T Nguyen
(74) *Attorney, Agent, or Firm* — JCIPRNET

(57) ABSTRACT

This heating device (100) includes: a heater (10) for heating an object (1) to be heated; a temperature detection unit (20) for detecting a temperature of the object (1) to be heated; and a temperature regulator (30) which controls the heater (10) so as to make the temperature of the object (1) to be heated equal to the target temperature. The temperature detection unit (20) comprises temperature sensors (21, 22). An identification unit (34) identifies, from temperature data detected by the temperature sensors (21, 22) and manipulation quantity data corresponding to electric power applied to the heater (10), a heat transfer function between the heater (10) and the temperature sensors (21, 22), and a heat transfer function between the respective temperature sensors (21, 22). A determination unit (36) detects a change of the transfer functions, and determines an abnormality in the heater (10) or the temperature sensors (21, 22).

6 Claims, 3 Drawing Sheets

(58) Field of Classification Search
CPC .... G05B 11/42; G05B 13/024; H05B 1/0227; H05B 1/023
USPC ...... 219/494, 486; 165/205; 236/78 B, 78 D; 700/300
See application file for complete search history.

(56) References Cited

U.S. PATENT DOCUMENTS

| | | |
|---|---|---|
| 2012/0245884 A1 | 9/2012 | Wohrle |
| 2016/0004226 A1 | 1/2016 | Tanaka et al. |

FOREIGN PATENT DOCUMENTS

| | | |
|---|---|---|
| EP | 0429959 | 6/1991 |
| JP | S6127110 | 2/1986 |
| JP | H0346013 | 2/1991 |
| JP | H0612133 | 1/1994 |
| JP | H06330747 A * | 11/1994 |
| JP | H08166826 | 6/1996 |
| JP | H09198147 | 7/1997 |
| JP | H09198148 | 7/1997 |
| JP | H1154244 | 2/1999 |
| JP | 2002124481 | 4/2002 |
| JP | 2011193148 | 9/2011 |
| TW | 518639 | 1/2003 |
| TW | 201042412 | 12/2010 |
| TW | 201602743 | 1/2016 |

OTHER PUBLICATIONS

"International Search Report (Form PCT/ISA/210) of PCT/JP2018/046936," dated Mar. 26, 2019, with English translation thereof, pp. 1-3.

"Written Opinion of the International Searching Authority (Form PCT/ISA/237) of PCT/JP2018/046936," dated Mar. 26, 2019, with English translation thereof, pp. 1-6.

"Office Action of China Counterpart Application" with English translation thereof, dated Aug. 26, 2021, p. 1-p. 12.

"Search Report of Europe Counterpart Application", dated Aug. 30, 2021, p. 1-p. 5.

* cited by examiner

HEATING DEVICE

CROSS-REFERENCE TO RELATED APPLICATION

This application is a 371 application of the International PCT application serial no. PCT/JP2018/046936, filed on Dec. 20, 2018, which claims the priority benefits of Japan Patent Application No. 2018-000998, filed on Jan. 9, 2018. The entirety of each of the above-mentioned patent applications is hereby incorporated by reference herein and made a part of this specification.

TECHNICAL FIELD

The present invention relates to a heating device including a heater that heats a heating object and a temperature detection unit that detects a temperature of the heating object.

BACKGROUND ART

Generally, heating devices for heating some sort of heating object include a heater that heats a heating object, a temperature sensor that detects a temperature of the heating object, and a temperature regulator that controls the heater based on detection of the temperature sensor.

Since the temperature regulator performs feedback control of the heater based on a detection value of the temperature sensor and a target temperature such that the temperature of the heating object reaches the target temperature, the temperature of the heating object reaches the target temperature in a stationary state. For example, such heating devices are described in Patent Literature 1, Patent Literature 2, and Patent Literature 3.

CITATION LIST

Patent Literature

[Patent Literature 1]
  Japanese Patent Laid-Open No. H6-12133
[Patent Literature 2]
  Japanese Patent Laid-Open No. H8-166826
[Patent Literature 3]
  Japanese Patent Laid-Open No. 2011-193148

SUMMARY OF INVENTION

Technical Problem

A heating device including the heater and a temperature sensor is provided on the premise that a temperature of a heating target is correctly detected by the temperature sensor and a heating object is heated normally by the heater. When there is an abnormality with one of these, the temperature of the heating object is not correctly controlled.

According to an objective of the present invention, there is provided a heating device capable of determining whether a temperature of a heating target is correctly detected by a temperature sensor or a heating object is heated normally by a heater.

Solution to Problem

As an example of the present disclosure, there is provided a heating device including a heater that heats a heating object, a temperature detection unit that detects a temperature of the heating object, and a temperature regulator that controls the heater based on a detection value of the temperature detection unit and a target temperature such that the temperature of the heating object reaches the target temperature. The temperature detection unit is constituted of a plurality of temperature sensors. The heating device includes an identification unit that identifies a plurality of transfer functions including heat transfer functions between the heater and the plurality of temperature sensors and a heat transfer function between the plurality of temperature sensors from temperature data detected by the plurality of temperature sensors and electric power applied to the heater or manipulation quantity data corresponding to the applied electric power, and a determination unit that detects a change from initial values of coefficients of the plurality of transfer functions and determines an abnormal part in the heater or the plurality of temperature sensors from the change.

In this constitution, an abnormal part in the heater or the plurality of temperature sensors can be determined.

In addition, in the example of the present disclosure, the determination unit detects the presence or absence of a change in transfer functions by comparing amounts of change from the initial values of the coefficients of the transfer functions and thresholds to each other.

In this constitution, the presence or absence of a change from the initial values of the transfer functions is detected easily, and an abnormal part in the heater or the plurality of temperature sensors is determined easily.

In addition, in the example of the present disclosure, the thresholds are set in accordance with ratios to the initial values of the coefficients of the transfer functions.

In this constitution, regarding a plurality of coefficients of the transfer functions, an abnormality in change thereof is detected equally, and an abnormal part in the heater or the plurality of temperature sensors is determined more accurately.

In addition, in the example of the present disclosure, the heating object is a heating unit of a hot resin molding machine, and the heater and the temperature detection unit are provided in the heating unit.

In this constitution, in an injection molding machine, an extrusion molding machine, or the like, molding of a defective product due to an abnormality of a heater or a temperature detection unit can be prevented.

Advantageous Effects of Invention

According to the present invention, it is possible to determine whether a temperature of a heating target is correctly detected by a temperature sensor or a heating object is heated normally by a heater, and thus it is possible to consequently achieve a heating device having high reliability.

DESCRIPTION OF EMBODIMENT

Hereinafter, an embodiment of the present invention will be described with reference to several drawings.

Application Example

Figure 1:
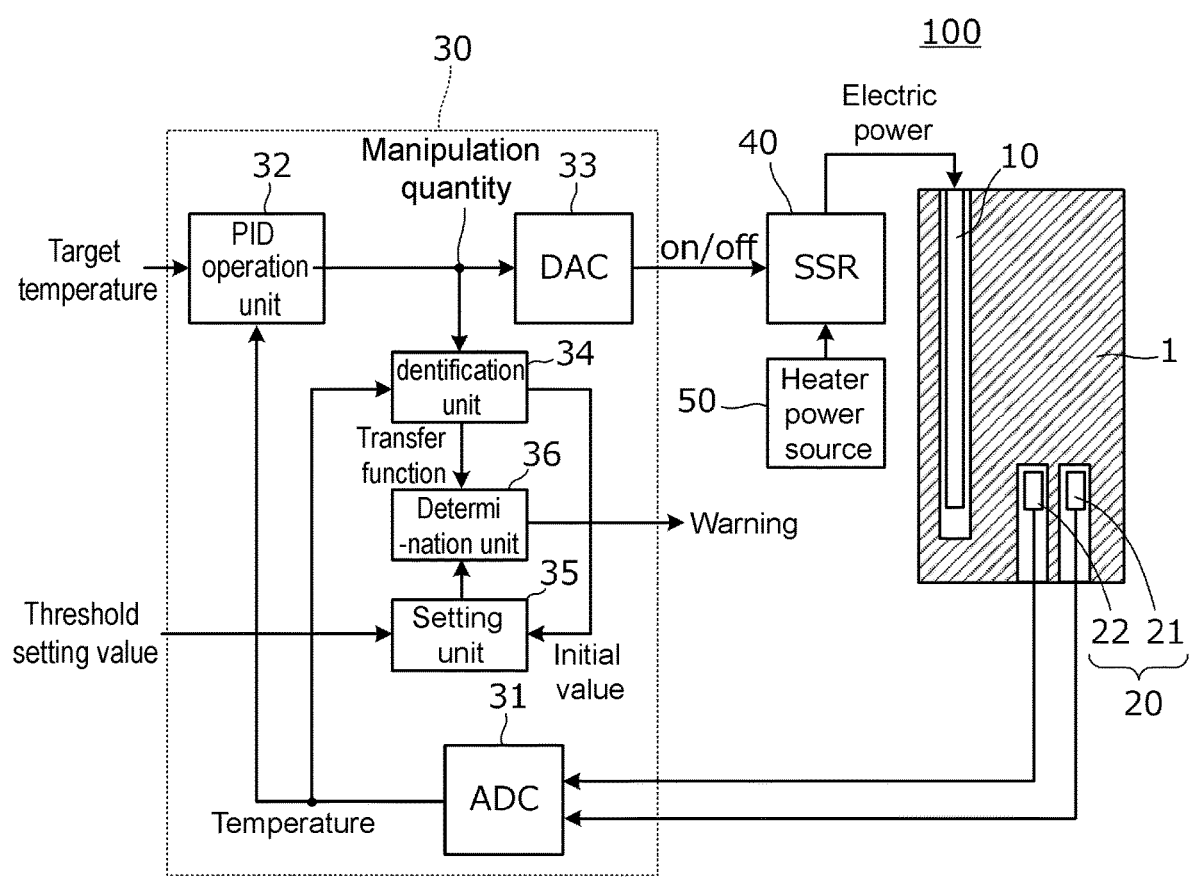
FIG. 1 is a view illustrating a constitution of a heating device 100 according to an embodiment of the present invention.

First, with reference to FIG. 1, an example in which the present invention is applied will be described. FIG. 1 is a view illustrating a constitution of a heating device 100 according to the embodiment of the present invention.

As illustrated in FIG. 1, the heating device 100 according to the present embodiment includes a heater 10 that heats a heating object 1, a temperature detection unit 20 that detects a temperature of the heating object 1, and a temperature regulator 30 that controls the heater 10 based on a detection value of the temperature detection unit 20 and a target temperature such that the temperature of the heating object 1 reaches the target temperature.

For example, the heating object 1 is a heating unit of a hot resin molding machine such as an injection molding machine or an extrusion molding machine, and the heater 10 and the temperature detection unit 20 are provided in the heating unit of the hot resin molding machine.

In this example, the temperature detection unit 20 is constituted of a first temperature sensor 21 and a second temperature sensor 22. The temperature regulator 30 includes an identification unit 34 that identifies heat transfer functions between the heater 10 and the temperature sensors 21 and 22 and a heat transfer function between the temperature sensors 21 and 22 from temperature data detected by the temperature sensors 21 and 22 and manipulation quantity data corresponding to electric power applied to the heater 10.

In addition, the temperature regulator 30 includes a determination unit 36 that detects a change from initial values of coefficients of the transfer functions and determines an abnormal part in the heater 10 or the temperature sensors 21 and 22 from this change.

With this constitution, an abnormal part in the heater 10 or the temperature sensors 21 and 22 can be determined.

Constitution Example

Next, a constitution of the heating device according to the embodiment of the present invention will be described with reference to the drawings. As described above, FIG. 1 is a view illustrating a constitution of the heating device 100 according to the embodiment of the present invention.

As illustrated in FIG. 1, the heating device 100 includes the heater 10 that heats the heating object 1, the temperature detection unit 20 that detects the temperature of the heating object 1, the temperature regulator 30 that controls the heater 10 based on the detection value of the temperature detection unit 20 and the target temperature such that the temperature of the heating object 1 reaches the target temperature, a solid state switch 40, and a heater power source 50. The heating object 1 is a molded body of a metal or the like. FIG. 1 is a block constitution diagram conceptually depicting the heating object 1. However, an actual shape is suitably set.

The temperature regulator 30 includes an A/D converter 31, a PID operation unit 32, a D/A converter 33, the identification unit 34, a setting unit 35, and the determination unit 36.

For example, each of the temperature sensors 21 and 22 is a thermocouple and is attached at a different position in the heating object 1. For example, the temperature sensors 21 and 22 are provided inside a nozzle of the injection molding machine, in a mold of the extrusion molding machine or in the vicinity thereof.

The A/D converter 31 converts an electromotive force of each of the temperature sensors 21 and 22 into digital data. The PID operation unit 32 obtains a manipulation quantity through a PID operation based on the target temperature set from the outside and an output value of the A/D converter 31. Since a plurality (two in this example) of pieces of temperature data is subjected to A/D conversion, the PID operation unit 32 uses temperature data obtained by performing statistical processing of two pieces of temperature data. For example, the average value of two pieces of temperature data is taken as temperature data used by the PID operation unit 32. The PID operation unit 32 outputs data of the manipulation quantity to the D/A converter 33. The D/A converter 33 generates a PWM signal corresponding to the manipulation quantity. This PWM signal is applied as an on/off signal for the solid state switch 40.

The identification unit 34 identifies the heat transfer functions between the heater 10 and the temperature sensors 21 and 22 and the heat transfer function between the temperature sensors 21 and 22 from the temperature data detected by the temperature sensors 21 and 22 and the manipulation quantity data corresponding to electric power applied to the heater 10.

The setting unit 35 sets the initial value of each of the coefficients of the heat transfer functions between the heater 10 and the temperature sensors 21 and 22 and the heat transfer function between the temperature sensors 21 and 22 obtained by the identification unit 34. In addition, the setting unit 35 sets a threshold setting value input from the outside.

The determination unit 36 detects a change from the initial values of the coefficients of the transfer functions, and an abnormal part in the heater 10 or the temperature sensors 21 and 22 is determined from this change.

A loop through the heater 10, the heating object 1, the temperature sensors 21 and 22, the A/D converter 31, the PID operation unit 32, the D/A converter 33, the solid state switch 40, and the heater 10 illustrated in FIG. 1 constitutes a feedback loop, and a temperature of a heating object is controlled through feedback control of the temperature regulator 30 such that it follows the target temperature.

Figure 2:
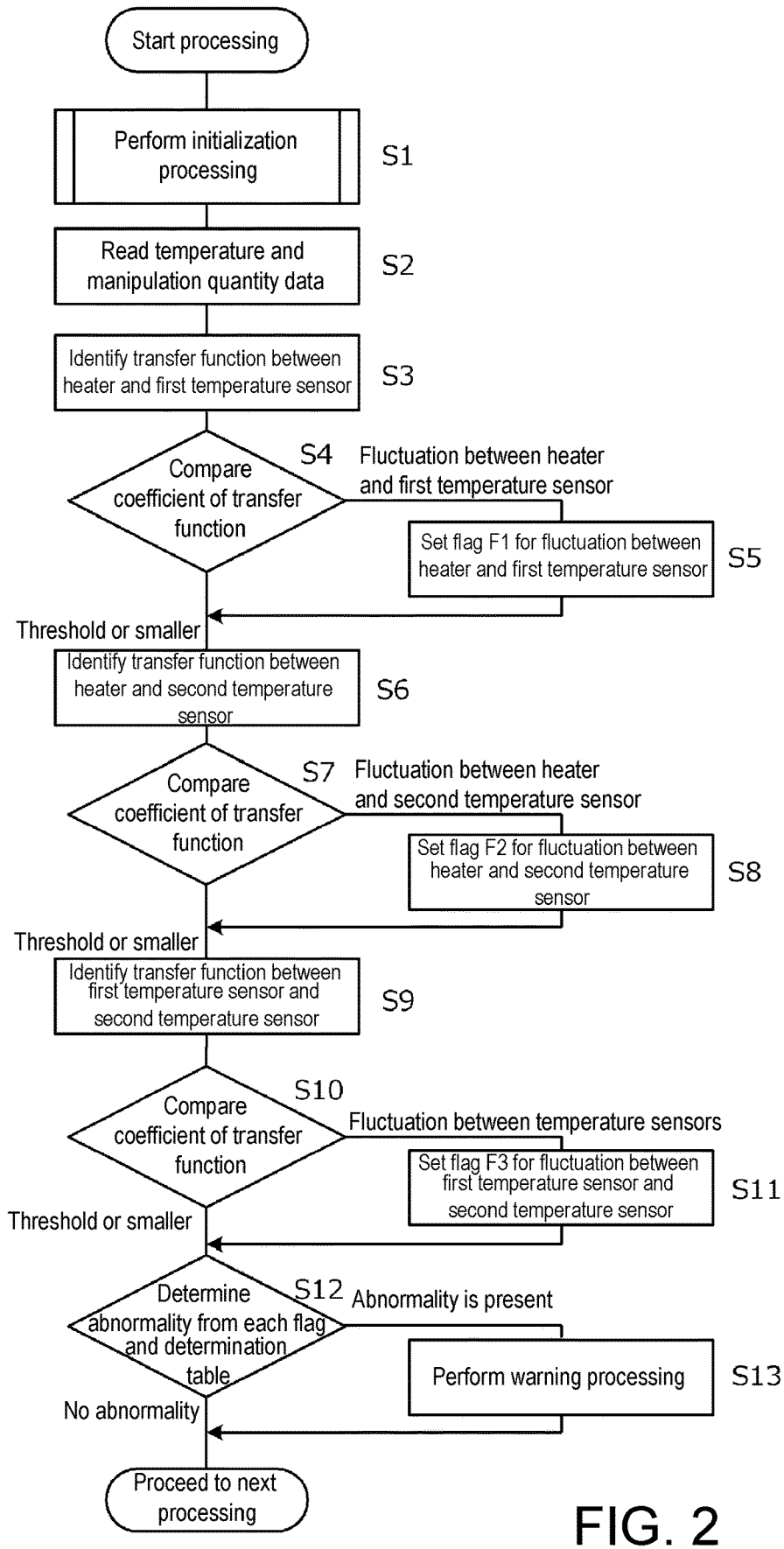
FIG. 2 is a flowchart showing details of steps of processing of a temperature regulator 30 particularly related to identifying transfer functions and determining an abnormal part.

FIG. 2 is a flowchart showing details of steps of processing of the temperature regulator 30 particularly related to identifying the transfer functions and determining an abnormal part. These steps of processing are steps of processing of the identification unit 34, the setting unit 35, and the determination unit 36 illustrated in FIG. 1.

First, initialization processing is performed (S1). Various flags are reset through this initialization processing, and the threshold setting value is read. Details of this initialization processing will be described below based on FIG. 3.

Thereafter, the temperature detected by the temperature sensor 21 and the data of the manipulation quantity are read, and a heat transfer function (first transfer function) between the heater 10 and the temperature sensor 21 is identified based on the temperature and the data of the manipulation quantity (S2 to S3).

A coefficient of the first transfer function and a threshold set in the initialization processing are compared to each other. When there is a fluctuation exceeding the threshold in the coefficient of the transfer function between the heater 10 and the temperature sensor 21, a flag F1 is set (S4 to S5).

Next, a heat transfer function (second transfer function) between the heater 10 and the temperature sensor 22 is identified based on the temperature detected by the temperature sensor 22 and the data of the manipulation quantity (S6).

A coefficient of the second transfer function and a threshold set in the initialization processing are compared to each other. When there is a fluctuation exceeding the threshold in the coefficient of the transfer function between the heater 10 and the temperature sensor 22, a flag F2 is set (S7 to S8).

In addition, a heat transfer function (third transfer function) between the temperature sensor 21 and the temperature sensor 22 is identified based on the temperature detected by the temperature sensor 21 and the temperature detected by the temperature sensor 22 (S9).

The coefficient of the transfer function and the threshold set in the initialization processing are compared to each other. When there is a fluctuation exceeding the threshold in the coefficient of the transfer function between the temperature sensor 21 and the temperature sensor 22, a flag F3 is set (S10 to S11).

Thereafter, the presence or absence of an abnormality and an abnormal part in the heater 10, the first temperature sensor 21, and the second temperature sensor 22 are determined based on the flags F1, F2, and F3 and a determination table which will be described below. If there is an abnormality, warning processing indicating that fact is performed (S12 to S13). For example, "ABNORMALITY IN HEATER", "ABNORMALITY IN FIRST TEMPERATURE SENSOR", and "ABNORMALITY IN SECOND TEMPERATURE SENSOR" are displayed.

Thereafter, the process proceeds to the next processing. A series of processing shown in FIG. 2 is executed repeatedly at predetermined time intervals. Alternatively, when heating processing is performed repeatedly, it is executed in each cycle of the heating processing.

Figure 3:
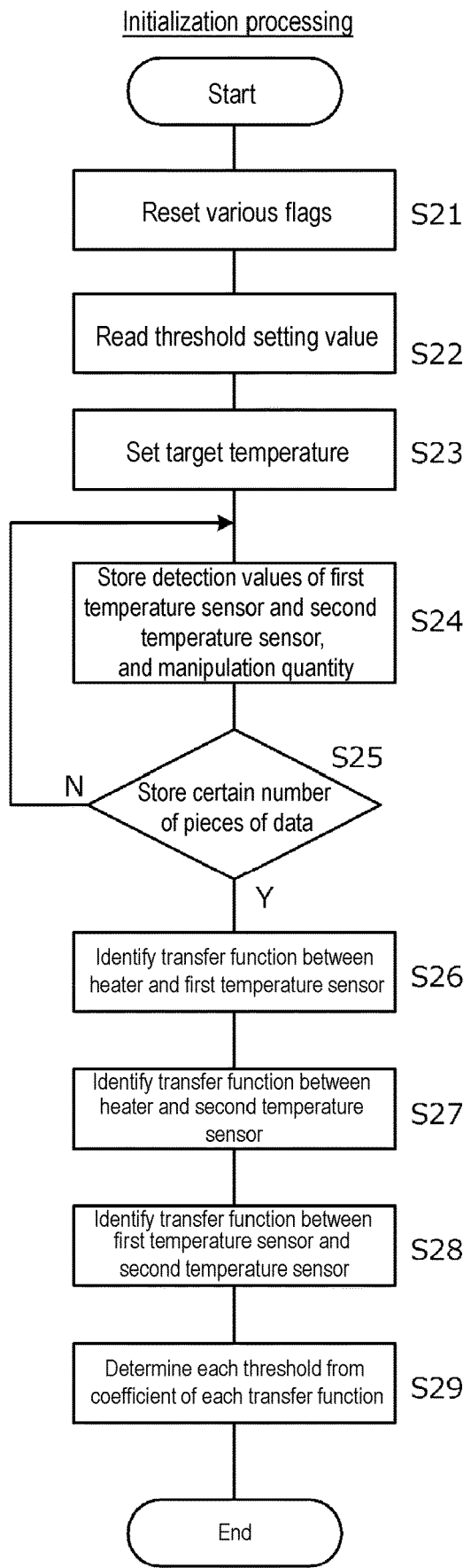
FIG. 3 is a flowchart showing details of initialization processing (S1) in FIG. 2.

FIG. 3 is a flowchart showing details of initialization processing (S1) in FIG. 2. First, various flags are reset (S21). Then, the threshold setting value is read from the outside (S22). For example, this is a value such as ±10% or ±15%, indicating a threshold range as a ratio.

Next, the target temperature is set to a predetermined value, and electric power applied to the heater 10 is changed (S23).

Since electric power applied to the heater 10 is changed due to a change of the target temperature, the temperature of the heating object changes as well in accordance with the lapse of time from when the target temperature is set. During this transition period, the temperature detected by the first temperature sensor 21, the temperature detected by the second temperature sensor 22, and the manipulation quantity output from the PID operation unit 32 are stored in time series (S24).

If a certain number of pieces of data are stored, the heat transfer function between the heater 10 and the first temperature sensor 21 is identified based on a certain number of pieces of data of the temperature detected by the first temperature sensor 21 and the manipulation quantity (S25 to S26). That is, each coefficient of this transfer function is obtained. Similarly, the heat transfer function between the heater 10 and the second temperature sensor 22 is identified based on a certain number of pieces of data of the temperature detected by the second temperature sensor 22 and the manipulation quantity (S27). In addition, the heat transfer function between the first temperature sensor 21 and the second temperature sensor 22 is identified based on a certain number of pieces of data of the temperature detected by the first temperature sensor 21 and the temperature detected by the second temperature sensor 22 (S28).

Thereafter, each threshold is determined from the coefficient of each of the transfer functions (S29).

Generally, a transfer function from an input to an output is obtained by performing Fourier conversion having input data as a denominator and output data as a numerator, for example. For example, in the present embodiment, when the heat transfer function (first transfer function) between the heater 10 and the first temperature sensor 21 is identified, time-series data (time-series data of the manipulation quantity) of the heater 10 corresponds to the input data, and time-series data of a detection temperature of the first temperature sensor 21 corresponds to the output data. Similarly, when the heat transfer function (second transfer function) between the heater 10 and the second temperature sensor 22 is identified, the time-series data (time-series data of the manipulation quantity) of the heater 10 corresponds to the input data, and the time-series data of the detection temperature of the second temperature sensor 22 corresponds to the output data. In addition, when the heat transfer function (third transfer function) between the first temperature sensor 21 and the second temperature sensor 22 is identified, the time-series data of the detection temperature of the first temperature sensor 21 corresponds to the input data, and the time-series data of the detection temperature of the second temperature sensor 22 corresponds to the output data.

All the first transfer function, the second transfer function, and the third transfer function are expressed as follows, for example.

$$F = k / \{(\tau_1 \cdot s + 1)(\tau_2 \cdot s + 1)\}$$

Here, all the factors k, $\tau_1$, and $\tau_2$, are coefficients. The factor k is a proportional gain, and the factors $\tau_1$ and $\tau_2$ are time constants. In addition, the factor s is a Laplacian operator.

With each of the coefficients k=1,000° C., $\tau_1$=10, and $\tau_2$=100 in an initial state, if the threshold setting value is ±10%, the initial value of each of the coefficients is as follows, for example.

TABLE 1

| Coefficient of transfer function | k | $\tau_1$ | $\tau_2$ |
|---|---|---|---|
| Upper limit threshold | 1,100 | 11 | 110 |
| Initial value (reference value) | 1,000 | 10 | 100 |
| Lower limit threshold | 900 | 9 | 90 |

The determination table shown in Step S12 of FIG. 2 is as follows, for example.

TABLE 2

| | Presence or absence of fluctuation in transfer function | | | Abnormality determined part | | |
|---|---|---|---|---|---|---|
| State No. | Between heater and first temperature sensor (F1) | Between heater and second temperature sensor (F2) | Between first and second temperature sensors (F3) | Heater | First temperature sensor | Second temperature sensor |
| 0 | Absent | Absent | Absent | | | |
| 1 | Present | Present | Absent | o | | |
| 2 | Present | Absent | Present | | o | |
| 3 | Absent | Present | Present | | | o |
| 4 | Present | Present | Present | uncertain (two or more parts) | | |

For example, if the flags F1 and F2 are set while the flag F3 remains in a reset state, it is determined that an abnormality has occurred in the heater 10. For example, this abnormality state includes slack of attachment of the heater 10, disconnection, and the like. That is, when a gap between the heater 10 and a heating object increases due to slack of attachment of the heater 10, a change in temperature of the heating object becomes gentle. Therefore, it is indicated as an abnormality in the coefficient of the transfer function between the heater 10 and the first temperature sensor 21 and the coefficient of the transfer function between the heater 10 and the second temperature sensor 22, and thus this can be determined. In addition, when disconnection occurs in the heater 10, a change in temperature of the heating object becomes abnormal. Therefore, it is indicated as an abnormality in the coefficient of the transfer function between the heater 10 and the first temperature sensor 21 and the coefficient of the transfer function between the heater 10 and the second temperature sensor 22, and thus this can be determined.

In addition, for example, if the flags F1 and F3 are set while the flag F2 remains in a reset state, it is determined that an abnormality has occurred in the first temperature sensor 21. For example, this abnormality state includes slack of attachment of the first temperature sensor 21, disconnection, and the like. That is, when slack of attachment of the first temperature sensor 21 occurs, a change in detection temperature of the first temperature sensor 21 becomes gentle. Therefore, it is indicated as an abnormality in the coefficient of the transfer function between the heater 10 and the first temperature sensor 21 and the coefficient of the transfer function between the first temperature sensor 21 and the second temperature sensor 22, and thus this can be determined. In addition, when disconnection occurs in the first temperature sensor 21, the temperature cannot be detected correctly. Therefore, it is indicated as an abnormality in the coefficient of the transfer function between the heater 10 and the first temperature sensor 21 and the coefficient of the transfer function between the first temperature sensor 21 and the second temperature sensor 22, and thus this can be determined.

Similarly, for example, if the flags F2 and F3 are set while the flag F1 remains in a reset state, it is determined that an abnormality has occurred in the second temperature sensor 22. For example, this abnormality state includes slack of attachment of the second temperature sensor 22, disconnection, and the like.

In addition, for example, if all the flags F1, F2, and F3 are set, it is determined that an abnormality has occurred in two or more of the heater 10 and the temperature sensors 21 and 22. That is, in this state, although an abnormal part cannot be determined, the presence or absence of an abnormality can be determined.

In the example described above, in order to detect whether or not the amounts of change in coefficients of the transfer functions exceed the thresholds, the thresholds are set in accordance with the ratios (+10%, −10%, or the like) to the initial values of the coefficients of the transfer functions. However, the embodiment is not limited thereto. For example, a difference may be set as a threshold for each of the coefficients.

In addition, dispersion of standard deviations or the like of each of the coefficients during a normal time may be actually measured, and a value three times thereof may be set as a threshold, for example. In addition, a fluctuation range of the coefficient allowed within a range in which control of the temperature regulator 30 performs a default operation may be set as a threshold.

In addition, instead of detecting whether or not an absolute value of the coefficient exceeds the threshold, whether or not the amount of change in coefficient per elapsed time exceed the threshold may be detected. Accordingly, a sudden change in attachment state of the heater 10 and the temperature sensors 21 and 22 can be detected with favorable responsiveness.

In the example illustrated in FIG. 1, manipulation quantity data corresponding to electric power applied to the heater 10 is used for identifying a transfer function. However, electric power applied to the heater 10 may be detected directly, and the data may be used for identifying a transfer function.

Lastly, it goes without saying again that descriptions of the embodiment for carrying out the invention described above are merely examples in all respects and are not limited. The embodiment can be suitably modified and changed by those skilled in the art.

For example, a form of the transfer function for performing identification is not also limited by the foregoing example. The heat transfer functions between the heater 10 and the temperature sensors 21 and 22 need only be approximated an actual transfer function, but they may be different from an actual transfer function. Since each of the coefficients of the heat transfer functions between the heater 10 and the temperature sensors 21 and 22 is obtained and an abnormality is determined by comparing these and thresholds, even if the transfer function for performing identification deviates from an actual transfer function in some measure, the presence or absence of an abnormality can be determined and an abnormal part can be determined.

In addition, in foregoing the embodiment, a heating device including two temperature sensors has been described. However, the embodiment can also be applied to a case of including three or more temperature sensors in a similar manner.

In addition, when a plurality of temperature sensors is included and a gap between the plurality of temperature sensors is large, a detection value obtained by the temperature sensors may be utilized for detecting a temperature distribution of a heating object.

The invention claimed is:

1. A heating device comprising:
a heater that heats a heating object;
a temperature detection unit that detects a temperature of the heating object; and
a temperature regulator that controls the heater based on the temperature of the heating object detected by the temperature detection unit and a target temperature, such that the temperature of the heating object detected by the temperature detection unit reaches the target temperature,
wherein the temperature detection unit includes a first temperature sensor and a second temperature sensor, and
wherein the temperature regulator comprises
an identification unit that identifies a plurality of transfer functions from temperature data detected by the first temperature sensor and the second temperature sensor, and electric power applied to the heater or manipulation quantity data corresponding to the electric power applied to the heater, the plurality of transfer functions including a first heat transfer function between the heater and the first temperature sensor, a second heat transfer function between the heater and the second temperature sensor, and a third heat transfer function between the first temperature sensor and the second temperature sensor, and
the first heat transfer function includes first heat transfer function coefficients at one timing and first heat transfer function coefficients at another timing, the second heat transfer function includes second heat transfer function coefficients at one timing and second heat transfer function coefficients at another timing, the third heat transfer function includes third heat transfer function coefficients at one timing and third heat transfer function coefficients at another timing,
a determination unit that detects:
a first change between the first heat transfer function coefficients at one timing and the first heat transfer function coefficients at another timing,
a second change between the second heat transfer function coefficients at one timing and the second heat transfer function coefficients at another timing,
a third change between the third heat transfer function coefficients at one timing and the third heat transfer function coefficients at another timing,
wherein the determination unit determines an abnormality has occurred in the heater, the first temperature sensor or the second temperature sensor based on the first change, the second change and the third change.

2. The heating device according to claim 1, wherein
the determination unit detects a presence or an absence of the first change by comparing an amount of the first change to a first predetermined threshold,
the determination unit detects a presence or an absence of the second change by comparing an amount of the second change to a second predetermined threshold,
the determination unit detects a presence or an absence of the third change by comparing an amount of the third change to a third predetermined threshold.

3. The heating device according to claim 2, wherein
the first predetermined threshold is set based on a ratio to the first heat transfer function coefficients at one timing,
the second predetermined threshold is set based on a ratio to the second heat transfer function coefficients at one timing, and
the third predetermined threshold is set based on a ratio to the third heat transfer function coefficients at one timing.

4. The heating device according to claim 1,
wherein the heating object is a heating unit of a hot resin molding machine, and the heater and the temperature detection unit are provided in the heating unit.

5. The heating device according to claim 2,
wherein the heating object is a heating unit of a hot resin molding machine, and the heater and the temperature detection unit are provided in the heating unit.

6. The heating device according to claim 3,
wherein the heating object is a heating unit of a hot resin molding machine, and the heater and the temperature detection unit are provided in the heating unit.

* * * * *